United States Patent
Song et al.

(10) Patent No.: US 8,660,510 B2
(45) Date of Patent: Feb. 25, 2014

(54) APPARATUS FOR RECEIVING ANALOG BASEBAND SIGNAL

(75) Inventors: Seong-Jun Song, Seoul (KR); Sang-Yun Hwang, Suwon-si (KR); Chul-Jin Kim, Yongin-si (KR); Jong-Rim Lee, Yongin-si (KR); Hyun-Kuk Choi, Suwon-si (KR); Seok-Yong Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/696,751

(22) PCT Filed: May 7, 2010

(86) PCT No.: PCT/KR2010/002936
§ 371 (c)(1),
(2), (4) Date: Nov. 7, 2012

(87) PCT Pub. No.: WO2011/138992
PCT Pub. Date: Nov. 10, 2011

(65) Prior Publication Data
US 2013/0052974 A1    Feb. 28, 2013

(51) Int. Cl.
*H04B 1/06* (2006.01)
*H04B 1/16* (2006.01)

(52) U.S. Cl.
USPC .................. 455/245.1; 455/334; 375/345

(58) Field of Classification Search
USPC ............ 455/232.1, 234.1, 245.1, 245.2, 296, 455/307, 334; 375/345, 346, 350
See application file for complete search history.

(56) References Cited

U.S. PATENT DOCUMENTS

| | | | | |
|---|---|---|---|---|
| 5,375,146 A | * | 12/1994 | Chalmers | .................. 375/350 |
| 7,183,980 B2 | | 2/2007 | Chang et al. | |
| 7,265,718 B2 | | 9/2007 | Tsai | |
| 7,830,953 B2 | * | 11/2010 | Fujiwara et al. | .............. 375/149 |
| 8,054,913 B2 | * | 11/2011 | Terada | ............... 375/316 |
| 2004/0097214 A1 | | 5/2004 | Gard et al. | |

(Continued)

FOREIGN PATENT DOCUMENTS

| CN | 1 692 561 | 11/2005 |
|---|---|---|
| CN | 101216544 | 7/2008 |

(Continued)

OTHER PUBLICATIONS

PCT/ISA/237 Written Opinion issued on PCT/KR2010/002936 (pp. 4).
PCT/ISA/210 Search Report issued on PCT/KR2010/002936 (pp. 3).

*Primary Examiner* — Quochien B Vuong
(74) *Attorney, Agent, or Firm* — The Farrell Law Firm, P.C.

(57) ABSTRACT

Provided is a receiving apparatus for processing an analog baseband signal in an information terminal that communicates using a dielectric. The receiving apparatus includes an electrode for receiving an electric-field signal; a first gain adjuster for gain adjustment by amplifying the received signal; a channel selection filter for selecting a signal corresponding to a receive channel bandwidth from the gain-adjusted signal; a second gain adjuster for gain adjustment by amplifying the selected signal; a comparator for converting a signal output from the second gain adjuster into a digital signal; an oversampler for oversampling the digital signal at a frequency $f_{Clock}$ higher than a receive channel frequency $f_{Signal}$; a demodulator for demodulating the oversampled signal; and a clock generator for providing necessary a clock signal to the oversampler and the demodulator.

11 Claims, 6 Drawing Sheets

(56) References Cited

U.S. PATENT DOCUMENTS

| | | |
|---|---|---|
| 2007/0229366 A1 | 10/2007 | Kim et al. |
| 2008/0266694 A1 | 10/2008 | Bliss et al. |
| 2008/0317176 A1 | 12/2008 | Oh |
| 2009/0256739 A1 | 10/2009 | Teshirogi et al. |
| 2010/0060502 A1 | 3/2010 | Toyama et al. |

FOREIGN PATENT DOCUMENTS

| | | |
|---|---|---|
| JP | 2006-050333 | 2/2006 |
| JP | 2010-062995 | 3/2010 |
| KR | 1020080112346 | 12/2008 |
| WO | WO 96/31960 | 10/1996 |
| WO | WO 2006/041041 | 4/2006 |

* cited by examiner

APPARATUS FOR RECEIVING ANALOG BASEBAND SIGNAL

PRIORITY

This application claims priority to Patent Application Serial No. PCT/KR2010/002939 filed on May 7, 2010, the entire disclosure of which is incorporated herein by reference.

BACKGROUND

1. Field of the Invention

The present invention relates generally to an information terminal that communicates over a dielectric medium, and more particularly, to a receiving apparatus for processing analog baseband signals.

2. Description of the Related Art

Electric-field communication may transfer data using a dielectric, e.g. air, water or the human body, as a transmission medium, to provide intuitive convenience and high security because data is transmitted after a user intuitively selects terminal devices.

Figure 1:
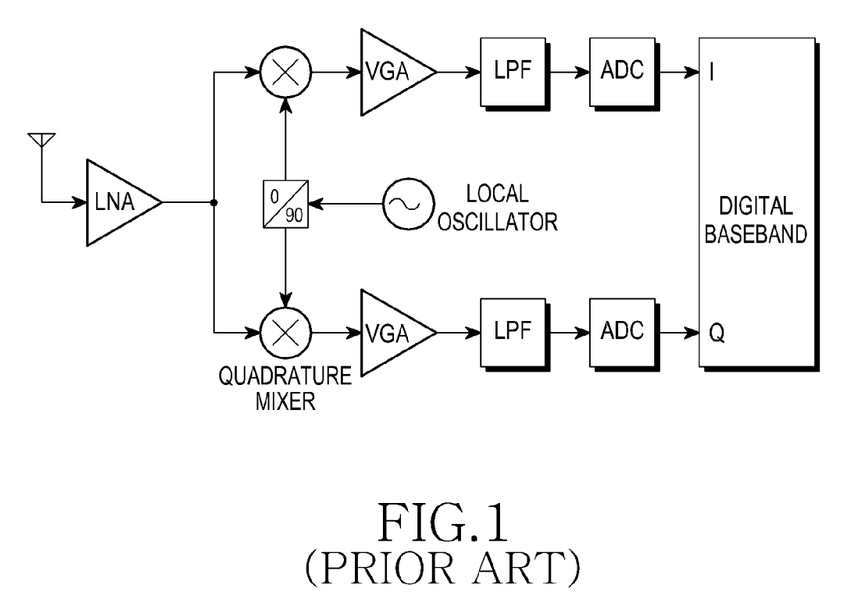
FIG. 1 illustrates a conventional RF receiving apparatus.

FIG. 1 illustrates a Radio Frequency (RF) receiving apparatus used in a conventional RF communication system.

In order to receive RF signals, the RF receiving apparatus should include components related to RF carrier signals, such as a Local Oscillator (LO), quadrature mixer, and Phase Locked Loop (PLL). The RF receiving apparatus should separate a received RF signal into an in-phase signal and a quadrature-phase signal, and convert an analog signal into a digital signal.

Figure 2:
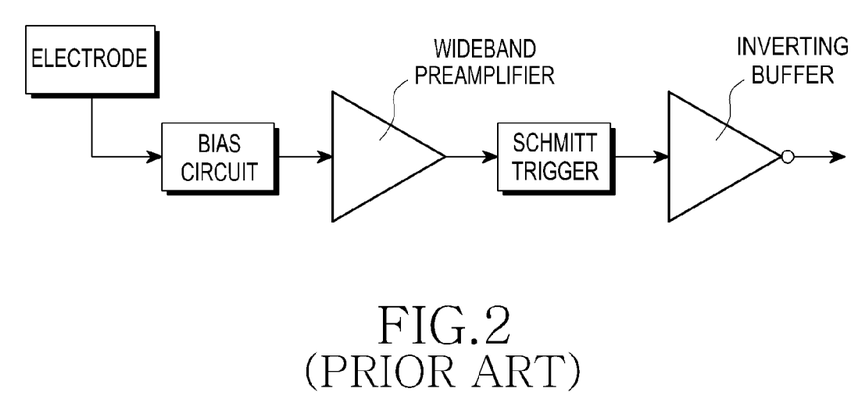
FIG. 2 illustrates a conventional broadband pulse signal receiving apparatus.

FIG. 2 illustrates a conventional broadband pulse signal receiving apparatus.

The broadband pulse signal receiving apparatus illustrated in FIG. 2 is configured to perform electric-field communication only with analog baseband signals, without using RF demodulation.

To restore a weak broadband pulse signal output from a communication channel that uses a human body as a transmission medium to a digital signal, the broadband pulse signal receiving apparatus requires 50-Ohm impedance matching, broadband amplification, and a symmetrical threshold triggering block.

Figure 3:
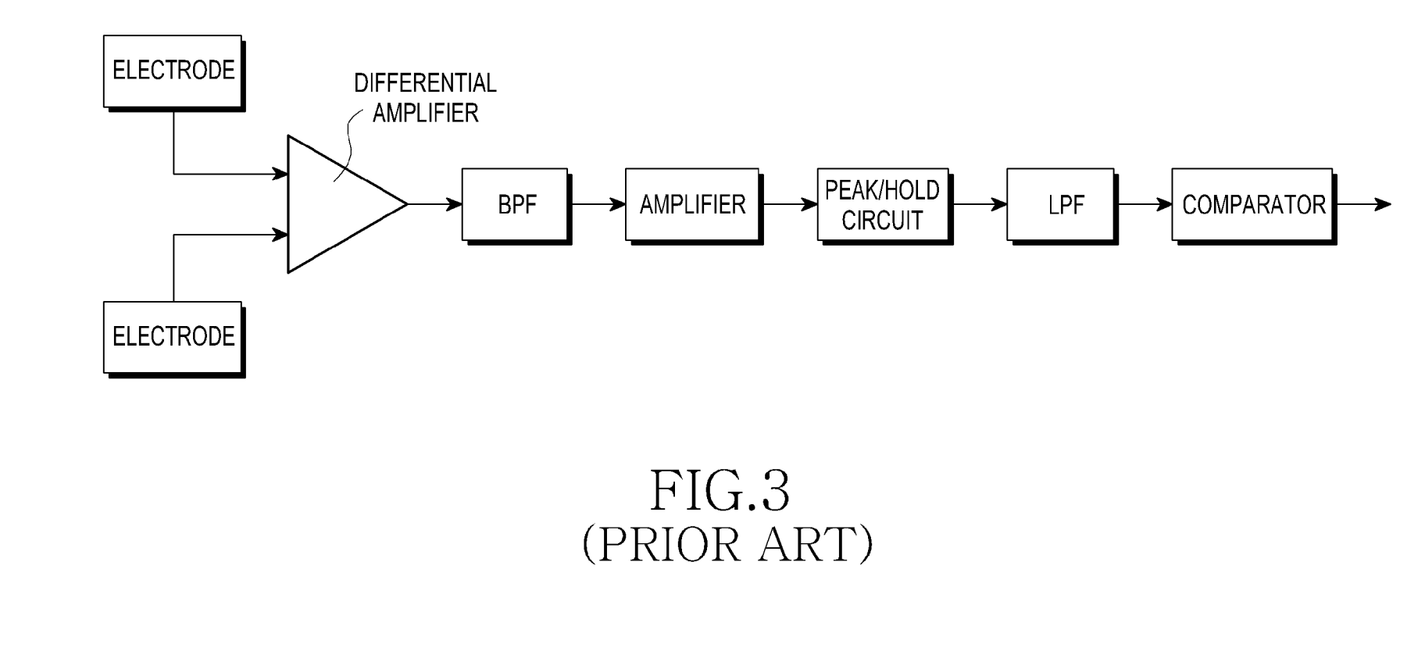
FIG. 3 illustrates a conventional ASK differential signal receiving apparatus.

FIG. 3 illustrates an apparatus for receiving an analog baseband differential signal modulated by Amplitude Shift Keying (ASK) in a conventional electric-field communication system.

The receiving apparatus of FIG. 3 uses two electrodes to receive differential signals. For ASK demodulation, the receiving apparatus uses a differential amplifier and a Band-Pass Filter (BPF) that passes only the carrier frequency band signal, and then amplifies the received signal using a peak/hold circuit. Thereafter, the receiving apparatus removes the remaining carrier signal with a Low-Pass Filter (LPF), and then restores the carrier-removed signal to a digital signal using a comparator.

However, the high-frequency band RF receiving apparatus in FIG. 1 requires components (e.g., LO, PLL and quadrature mixers) for processing an RF carrier signal, and components (e.g., a pair of Variable Gain Amplifiers (VGAs), LPFs, and Analog Digital Converters (ADCs)) for processing both an in-phase signal and a quadrature-phase signal, causing an increase in power consumption and space. If a direct conversion structure is used for the LO, DC offset or I/Q mismatch problems may occur.

In the electric-field communication system that employs the analog baseband transmission scheme of FIG. 2, an amplifier having a bandwidth of 100 MHz or more is required to receive broadband pulse signals. This communication system is vulnerable to noise, i.e. interference, from signals out of the reception band since it lacks a filter. In addition, since the communication system utilizes a bandwidth of 100 MHz or more, it may be affected by in-phase RFID signals, such as smartcard operating at 13.56 MHz, or by FM radio signals between about 88 MHz to 108 MHz, causing degradation of performance.

The receiving structure of FIG. 3 is configured to receive analog baseband signals modulated only by ASK, and has two receiving electrodes, which increases installation complexity.

SUMMARY OF THE INVENTION

The present invention has been made to solve the above-stated problems with conventional systems and methods. According to an aspect of the present invention, there is provided a receiving apparatus capable of receiving analog signals modulated by various different baseband modulation schemes for data communication between information terminals.

Another aspect of the present invention provides a receiving apparatus having a wide input dynamic range and an excellent receive sensitivity for data communication between information terminals.

In accordance with an aspect of the present invention, an apparatus is provided for receiving an analog baseband signal that includes an electrode for receiving an electric-field signal; a first gain adjuster for gain adjustment by amplifying the received electric-field signal; a channel selection filter for selecting a signal corresponding to a receive channel bandwidth from the gain-adjusted signal; a second gain adjuster for gain adjustment by amplifying the selected signal; a comparator for converting a signal output from the second gain adjuster into a digital signal; an oversampler for oversampling the digital signal at a frequency higher than a receive channel frequency; a demodulator for demodulating the oversampled signal; and a clock generator for providing a clock signal to the oversampler and the demodulator.

When an analog baseband signal receiving apparatus of the present invention is used in the electric-field communication environment, the wide input dynamic range may be ensured and an improved receive sensitivity is obtained, making it possible to implement various application scenarios not only for the contact environment but also for the non-contact environment. In addition, the receiving apparatus may receive analog signals modulated by various different baseband modulation schemes because of its variable bandwidth, thereby improving the freedom of selecting the modem modulation scheme.

BRIEF DESCRIPTION OF THE DRAWINGS

The above and other aspects, features and advantages of the present invention will be more apparent from the following description taken in conjunction with the accompanying drawings, in which.

DETAILED DESCRIPTION OF EMBODIMENTS OF THE PRESENT INVENTION

Embodiments of the present invention will now be described in detail with reference to the accompanying drawings. Throughout the drawings, the same drawing reference numerals will be understood to refer to the same elements, features and structures. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 4:
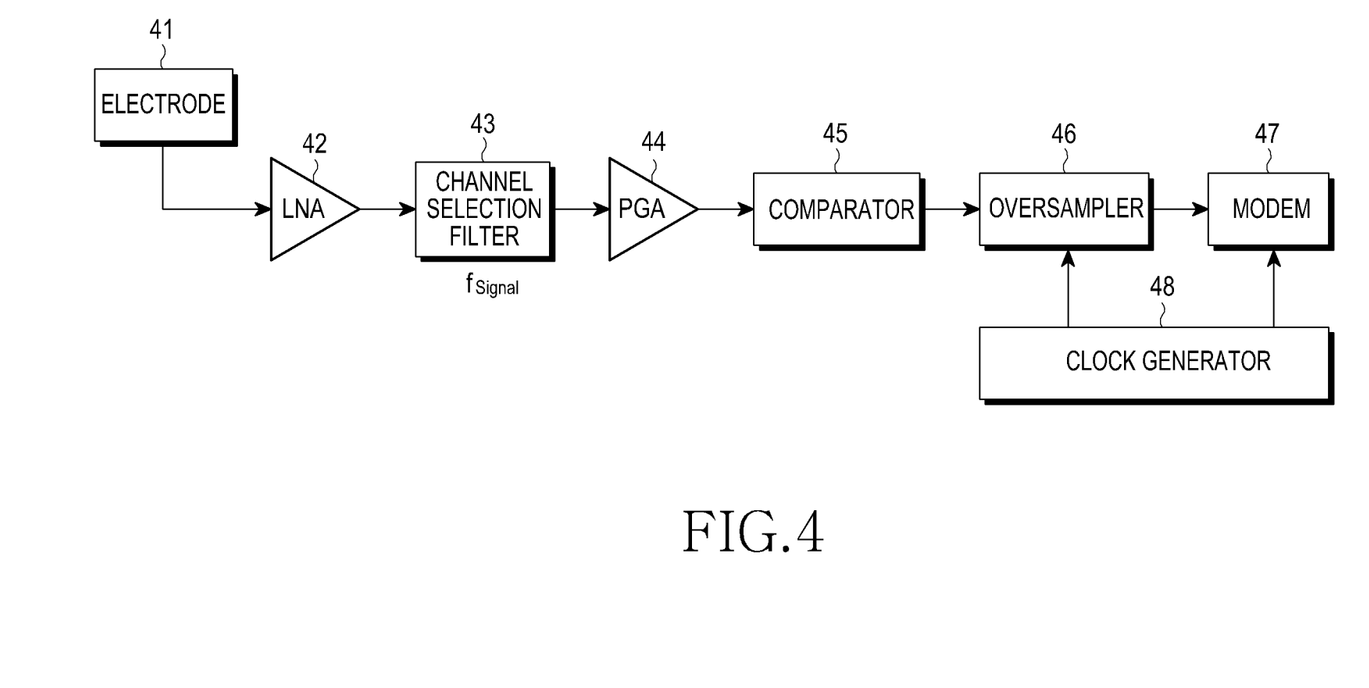
FIG. 4 illustrates an analog baseband signal receiving apparatus according to the present invention.

FIG. 4 illustrates an analog baseband signal receiving apparatus of the present invention.

An electrode 41 is provided to receive an electric-field signal induced in a dielectric. A Low Noise Amplifier (LNA) 42, provided to low-noise-amplify a signal received from the electrode 41, is a first gain adjuster for adjusting a gain by amplifying the received signal. A channel selection filter 43 is provided to select a signal corresponding to a receive channel bandwidth from the gain-adjusted signal. At this time, interference may be canceled from the amplified signal. A Programmable Gain Amplifier (PGA) 44 is a second gain adjuster for gain adjustment by amplifying the signal selected by the channel selection filter 43. PGA 44 is provided to amplify the selected signal into a signal large enough to stably convert the selected signal into a digital signal. A comparator 45 converts a signal output from the PGA 44 into a digital signal. An oversampler 46 is provided to oversample the digital signal at a frequency ($f_{Clock}$) higher than a receive channel frequency ($f_{Signal}$). A modem 47 is a demodulator for demodulating the oversampled signal. A clock generator 48 provides a clock signal to the oversampler 46 and the modem 47.

The oversampler 46 oversamples the digital signal at the frequency $f_{Clock}$ higher than the receive channel frequency $f_{Signal}$ to:
1) increase a Signal to Noise Ratio (SNR) in the modem 47 to detect 1-bit energy merely using a 1-bit comparator instead of using ADCs with large power consumption;
2) perform data synchronization by combining multiple oversampling values in the modem 47, since a locking time problem may occur even though Clock and Data Recovery (CDR) may be used for the data synchronization; and
3) improve receive sensitivity by minimizing an influence of switching noise coupling.

Figure 5:
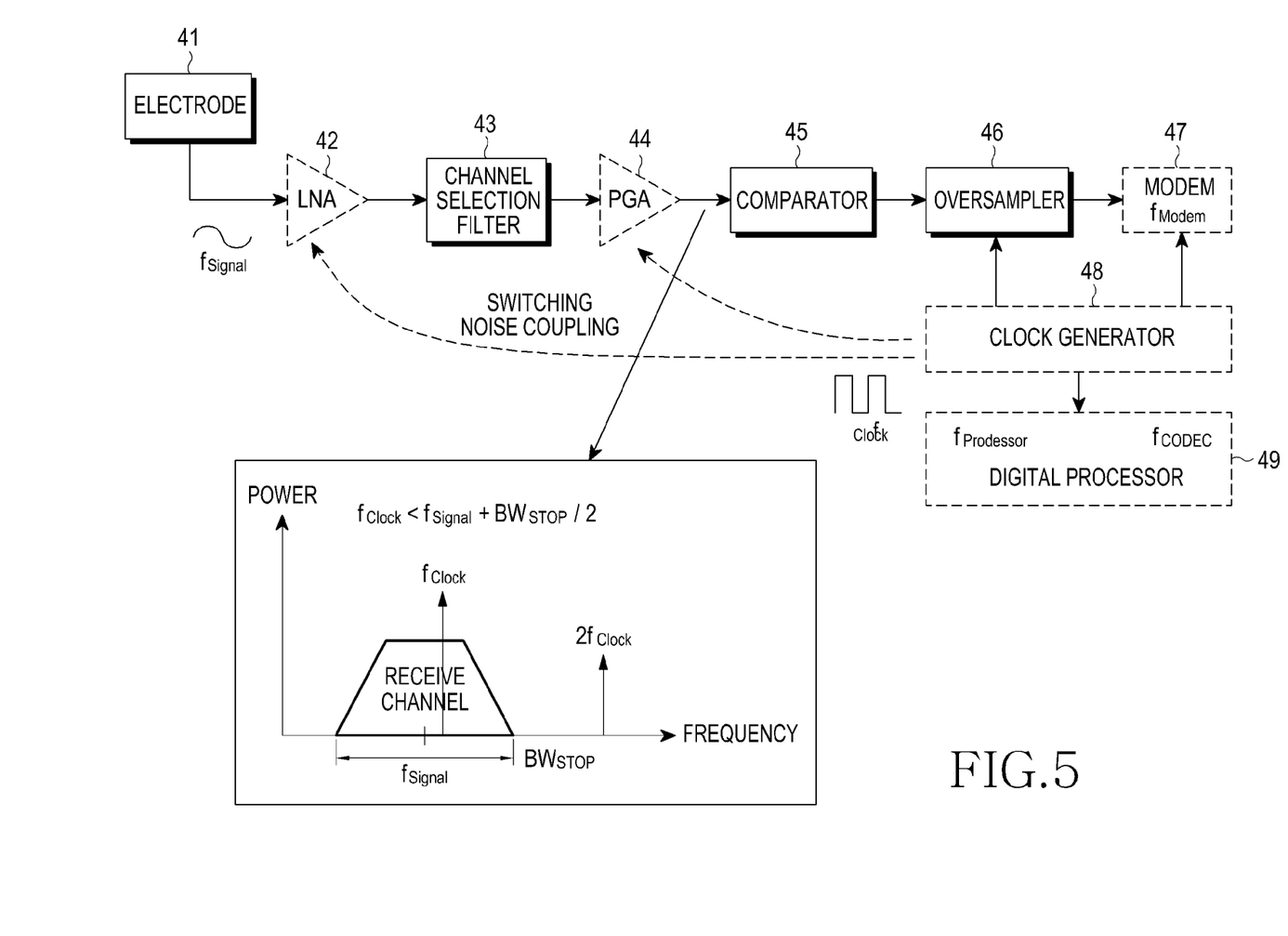
FIG. 5 illustrates an influence of switching noise coupling in an analog baseband signal receiving apparatus according to the present invention.

FIG. 5 illustrates the influence of switching noise coupling in an analog baseband signal receiving apparatus according to the present invention.

A switching noise occurs due to a digital clock signal generated by a clock generator 48, and the switching noise is transmitted through the power or ground path, or through the chip substrate, affecting analog circuits, especially, LNA 42 and PGA 44.

A frequency spectrum of an input signal to the comparator 45 is an output stage of the analog circuit. Accordingly, receive channel signals appear having a specific band around $f_{Signal}$. Because a clock signal is also based on a baseband digital signal, a $f_{Clock}$ frequency signal and a $2f_{Clock}$ frequency signal, which is a second harmonic component, appear. If the clock frequency is less than a sum of the signal frequency and a half of a channel stop bandwidth, i.e., if it has a relational expression of Equation (1), a frequency component of the clock signal is in the receive channel band, as in-phase interference.

$$f_{Clock} < f_{Signal} + \frac{BW_{STOP}}{2} \tag{1}$$

A bandwidth condition is required for a stopband rather than a passband to sufficiently reduce interference considering a noise margin, because even when the interference is out of the passband, interference strength decreases slightly in the stopband. Therefore, if the strength of the received signal is higher than that of the clock signal's frequency component including the harmonic frequency component, coupling interference is not an issue. However, for a channel environment with a large path loss, since the strength of the received signal is small, the receive sensitivity may decrease due to the interference component. In addition, since switching coupling interference occurs even when clock frequencies $f_{Modem}$, $f_{Processor}$ and $f_{CODEC}$ are used not only in the clock generator 48 but also in the modem 47 or a digital processor 49, e.g., a processor and a codec, all clock frequencies used in these components should also satisfy Equation (2) to increase the receive sensitivity of the analog baseband signal receiving apparatus:

$$f_{Clock}, f_{Modem}, f_{Processor}, f_{CODEC} \geq f_{Signal} + \frac{BW_{STOP}}{2} \tag{2}$$

Figure 6:
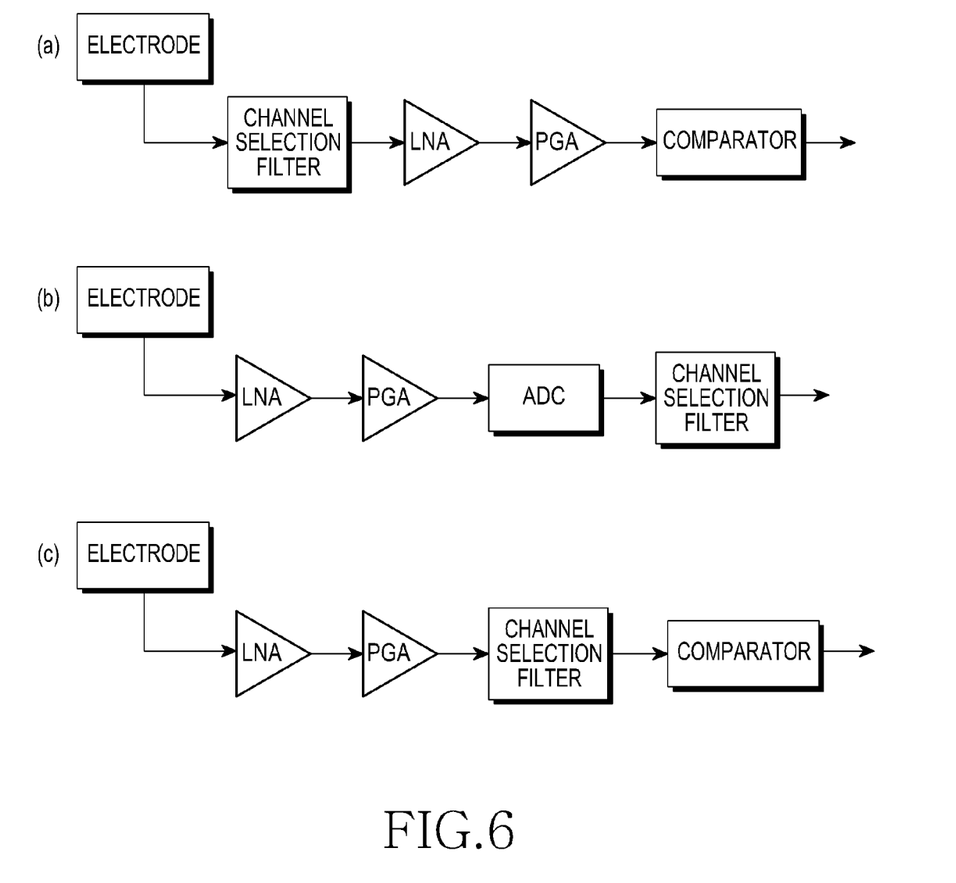
FIGS. 6A to 6C illustrate analog baseband signal receiving apparatuses according to the present invention.

FIGS. 6A to 6C illustrate analog baseband signal receiving apparatuses according to the present invention. Other components not shown in FIGS. 6A to 6C, are the same as or similar to those described in FIG. 4.

FIG. 6A illustrates a structure in which the channel selection filter is disposed in the foremost stage, and this structure amplifies the received signal after passing only the desired channel band. Placing the components in this order reduces the bandwidth of the LNA and the PGA. Since interference is removed in the front stage, their linearity is permitted to be lower, and the received signal may be sufficiently amplified so that the comparator may stably restore a received signal to a digital signal. The channel selection filter is an analog filter, and is usually configured with an active filter component since it operates at a baseband frequency. However, because the input impedance should be high in order to better detect the received signal, interference occurring at the input increases, so the interference may be amplified by the total voltage gain of the LNA and the PGA. In addition, all of the interference occurring in the LNA is also amplified by the voltage gain of the PGA, which reduces the entire SNR performance.

FIG. 6B illustrates a structure in which the channel selection filter is provided digitally, rather than in an analog manner. This order of components reduces power consumption and space requirements since characteristics of the filter may be easily varied by adjustment of digital settings, though an ADC having high linearity and excellent noise characteristics is required. In addition, an AGC function should also be added in front of the ADC to prevent the saturation of the received signal.

FIG. 6C illustrates a structure in which the received signal is filtered by the channel selection filter after the received signal is sufficiently amplified by the LNA and the PGA. This order of components provides excellent noise performance, and can be used for an ultrasonic receiving apparatus because interference occurring out of the reception band in the LNA and the PGA may be removed by the filter. However, because both the in-phase signal and the out-band signal with interference noise are amplified by the total voltage gain of the LNA and the PGA, they may be amplified only within the range in which the channel selection filter has no linearity problem, resulting in a limited input dynamic range. If the voltage gain is reduced to widen the linear range, the comparator may not obtain the voltage gain required to obtain the minimum received signal level used to stably restore the received signal to a digital signal, thereby reducing improvement of the receive sensitivity.

As the total interference calculated depends on the order of the components, FIG. 6C shows the best noise characteristics and FIG. 4 shows the next best noise characteristics. However, FIG. 6C has a limitation in input dynamic range, and thus provides less improvement of the receive sensitivity. In particular, the electric-field communication channel environment requires a wide input dynamic range because a path loss difference between the electrode-contact environment and the electrode-non-contact environment is as much as 60 dB or more, and since the receive sensitivity required in the non-contact environment is also about several tens of mV, the voltage gain should also be high in order for the comparator to stably restore the received signal to a digital signal. Therefore, the order in which the components are disposed in FIG. 4 is most appropriate in the electric-field communication channel environment.

By comparison, the total interference calculated for the above-described different orders of component disposition is provided in Equations (3) to (6):

In the apparatus of FIG. 4:

$$G_{PGA}(\alpha N_{LNA}+N_{filter})+N_{PGA} \qquad (3)$$

In the apparatus of FIG. 6A:

$$G_{PGA}(N_{LNA}+G_{LNA}N_{Filter})+N_{PGA} \qquad (4)$$

In the apparatus of FIG. 6B:

$$G_{PGA}N_{LNA}+N_{PGA} \qquad (5)$$

In the apparatus of FIG. 6C:

$$G_{PGA}\alpha N_{LNA}+N_{Filter}+\alpha N_{PGA} \qquad (6)$$

where $G_{LNA}$ is voltage gain of LNA,
$N_{PGA}$ is voltage gain of PGA,
$N_{LNA}$ is noise occurring in LNA,
$G_{PGA}$ is noise occurring in PGA,
$N_{Filter}$ is noise occurring in the channel selection filter, and
$\alpha$ is a ratio of passband bandwidth of the channel selection filter to bandwidth of the LNA and the PGA, with noise of the channel selection filter assumed to be less than noise of LNA ($N_{filter} \ll N_{LNA}$)

Specifically, a relationship between the receiving apparatus of FIG. 4 and the receiving apparatus of FIG. 6C in terms of the input dynamic range and the receive sensitivity is as follows, based on an assumption that:

$P_N$: thermal noise power,
B: channel bandwidth,
NF: receiver noise figure,
$P_{No}$: thermal noise power's spectral density,
$P_{TH}$: input threshold power of comparator,
$SNR_{REQ}$: modem required SNR,
$(P_O)_{MAX}$: maximum saturated output power, and
$(P_1)_{MIN}$: minimum input power, then the thermal noise power of the receiving apparatus is as shown in Equation (7):

$$P_N = P_{N_0} + 10 \cdot \log_{10}(B) + NF \qquad (7)$$

In order for the comparator to stably restore the received signal to a digital signal, the condition of Equation (8) should be satisfied:

$$P_{TH} \leq P_K + G_{LNA} + G_{PGA} + SNR_{REQ} \qquad (8)$$

Receive sensitivity of the receiving apparatus is provided in Equation (9):

$$(P_1)_{MIN} = P_N + SNR_{REQ} \qquad (9)$$

Therefore, utilizing Equation (8), the minimum range of the receive sensitivity is defined as Equation (10):

$$(P_1)_{MIN} \geq P_{TH} - G_{LNA} - G_{LNA} \qquad (10)$$

A dynamic range $DR|_5$ of the receiving apparatus in FIG. 4 is determined as in Equation (11) when the received signal is not saturated in the channel selection filter:

$$DR|_5 = (P_0)_{MAX} - G_{LNA} - (P_1)_{MIN} \qquad (11)$$

Likewise, a dynamic range $DR|_{6c}$ of the receiving apparatus shown in FIG. 6C is defined as Equation (12):

$$DR|_{6c} = (P_0)_{MAX} - G_{LNA} - G_{PGA} - (P_1)_{MIN} \qquad (12)$$

It may be noted from Equations (11) and (12) that for the same receive sensitivity, the dynamic range of the receiving apparatus in FIG. 4 is wider by $G_{PGA}$ than the dynamic range of the receiving apparatus in FIG. 6C. Although the voltage gains of LNA and PGA may be reduced to broaden the dynamic range of the receiving apparatus in FIG. 6C, it may be noted from Equation (10) that if the voltage gains are reduced, the receive sensitivity or the minimum received input level should be increased. In this regard, the receiving apparatus in FIG. 4 will broaden the input dynamic range and improve the receive sensitivity.

Figure 7:
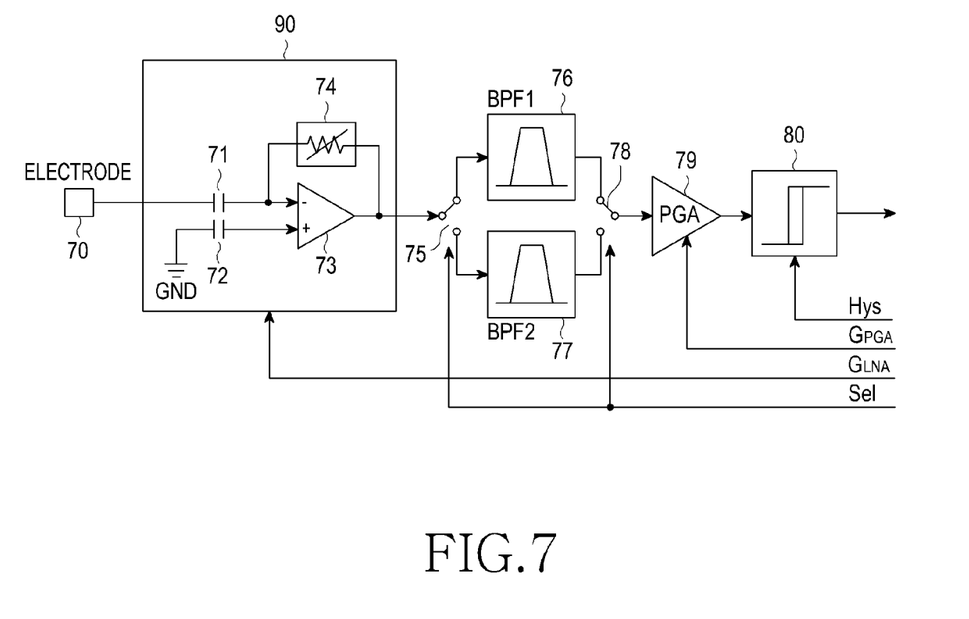
FIG. 7 illustrates an analog baseband signal receiving apparatus according to another embodiment of the present invention.

FIG. 7 illustrates an analog baseband signal receiving apparatus according to another embodiment of the present invention.

A signal transmitted through a dielectric and received via an electrode 70 has no DC potential, so it should internally undergo DC biasing. Therefore, the DC path between the transmitting apparatus and the dielectric and the receiving apparatus is removed, and the receiving apparatus is configured to receive the received signal by AC coupling in order to eliminate the noise in the low-frequency band, including 60 Hz.

An LNA 90 is configured to adjust its receiving impedance to obtain performance that is optimized to the channel environment. In addition, the LNA 90 has a differential input structure (71 and 72) to eliminate external common mode noise and connects one differential input terminal 72 to the ground GND by AC coupling, taking into account an influence of a ground return (GND return) path, i.e., coupling between the ground of the Rx side and the ground of the Tx side.

Because the path loss varies depending on the channel environment, voltage gains of the LNA 90 and a PGA 79 may be adjusted by a modem (not shown). The modem provides a signal $G_{PGA}$ for controlling a PGA gain, and a signal $G_{LNA}$ for controlling an LNA gain.

A channel selection filter unit includes two BPFs 76 and 77, and switches 75 and 78 to select a received signal according to each receive channel frequency. For the BPFs 76 and 77, their pass bandwidth may be adjusted depending on the transfer rate or the modulation scheme, and the channel environment. The modem provides a signal (Sel) for BPF selection.

For a comparator 80, hysteresis is controlled according to a hysteresis control signal (Hys) provided from the modem.

While the invention has been shown and described with reference to certain embodiments thereof, it will be understood by those skilled in the art that various changes in form and details may be made therein without departing from the spirit and scope of the invention as defined by the appended claims and their equivalents.

The invention claimed is:

1. An apparatus for receiving an analog baseband signal, the apparatus comprising:
    an electrode for receiving an electric-field signal;
    a first gain adjuster for gain adjustment by amplifying the received electric-field signal;
    a channel selection filter for selecting a signal corresponding to a receive channel bandwidth from the gain-adjusted signal;
    a second gain adjuster for gain adjustment by amplifying the selected signal;
    a comparator for converting a signal output from the second gain adjuster into a digital signal;
    an oversampler for oversampling the digital signal at a frequency higher than a receive channel frequency;
    a demodulator for demodulating the oversampled signal; and
    a clock generator for providing a clock signal to the oversampler and the demodulator.

2. The apparatus of claim 1, wherein the first gain adjuster is a low noise amplifier.

3. The apparatus of claim 1, wherein the second gain adjuster is a programmable gain amplifier.

4. The apparatus of claim 1, wherein the channel selection filter includes a plurality of band-pass filters and switches for selection of a received signal from one of a plurality of receive channel frequencies; and
    wherein the plurality of switches are switched to select a band-pass filter for a selected receive channel frequency.

5. The apparatus of claim 1, wherein the channel selection filter selects only the receive channel bandwidth signal.

6. An apparatus for receiving an analog baseband signal, the apparatus comprising:
    an electrode for receiving an electric-field signal;
    a channel selection filter for selecting a signal corresponding to a receive channel bandwidth from the received electric-field signal;
    a low noise amplifier for gain adjustment by amplifying the selected signal;
    a programmable gain amplifier for gain adjustment by amplifying the gain-adjusted signal;
    a comparator for converting a signal output from the programmable gain amplifier into a digital signal;
    an oversampler for oversampling the digital signal at a frequency higher than a receive channel frequency;
    a demodulator for demodulating the oversampled signal; and
    a clock generator for providing a clock signal to the oversampler and the demodulator.

7. The apparatus of claim 6, wherein the channel selection filter selects only the receive channel bandwidth signal.

8. An apparatus for receiving an analog baseband signal, the apparatus comprising:
    an electrode for receiving an electric-field signal;
    a low noise amplifier for gain adjustment by amplifying the received electric-field signal;
    a programmable gain amplifier for gain adjustment by amplifying the gain-adjusted signal;
    an analog to digital converter for converting a signal output from the programmable gain amplifier into a digital signal;
    a channel selection filter for selecting a signal corresponding to a receive channel bandwidth from the digital signal;
    a demodulator for demodulating the selected signal; and
    a clock generator for providing a clock signal to the demodulator.

9. The apparatus of claim 8, wherein the channel selection filter selects only the receive channel bandwidth signal.

10. An apparatus for receiving an analog baseband signal, the apparatus comprising:
    an electrode for receiving an electric-field signal;
    a low noise amplifier for gain adjustment by amplifying the received electric-field signal;
    a programmable gain amplifier for gain adjustment by amplifying the gain-adjusted signal;
    a channel selection filter for selecting a signal corresponding to a receive channel bandwidth from the signal output from the programmable gain amplifier;
    a comparator for converting the selected signal into a digital signal;
    an oversampler for oversampling the digital signal at a frequency higher than a receive channel frequency;
    a demodulator for demodulating the oversampled signal; and
    a clock generator for providing a clock signal to the demodulator.

11. The apparatus of claim 10, wherein the channel selection filter selects only the receive channel bandwidth signal.

* * * * *